Sept. 13, 1955 G. O. JOHNSON 2,717,676
CLUTCH FOR PUNCH PRESSES
Filed Oct. 8, 1951 3 Sheets-Sheet 1

INVENTOR.
Gustaf O. Johnson
BY
Attorney

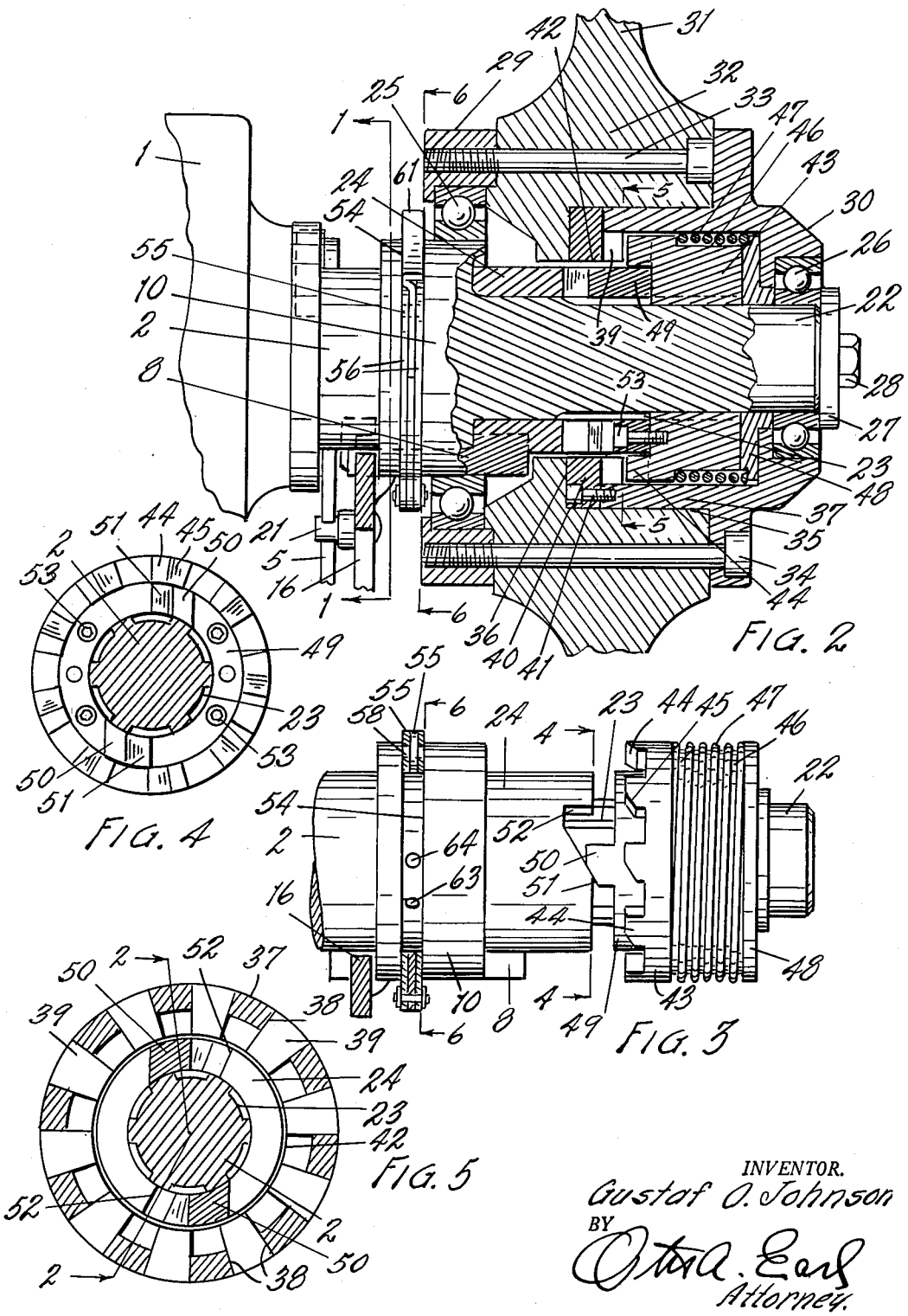

Sept. 13, 1955  G. O. JOHNSON  2,717,676
CLUTCH FOR PUNCH PRESSES
Filed Oct. 8, 1951  3 Sheets-Sheet 3
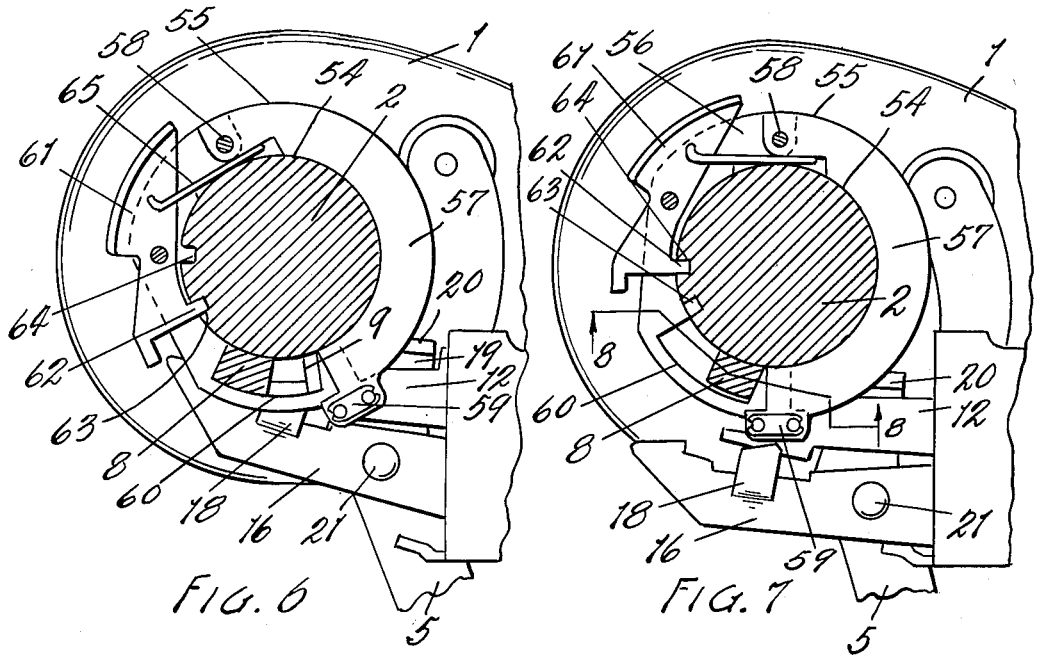
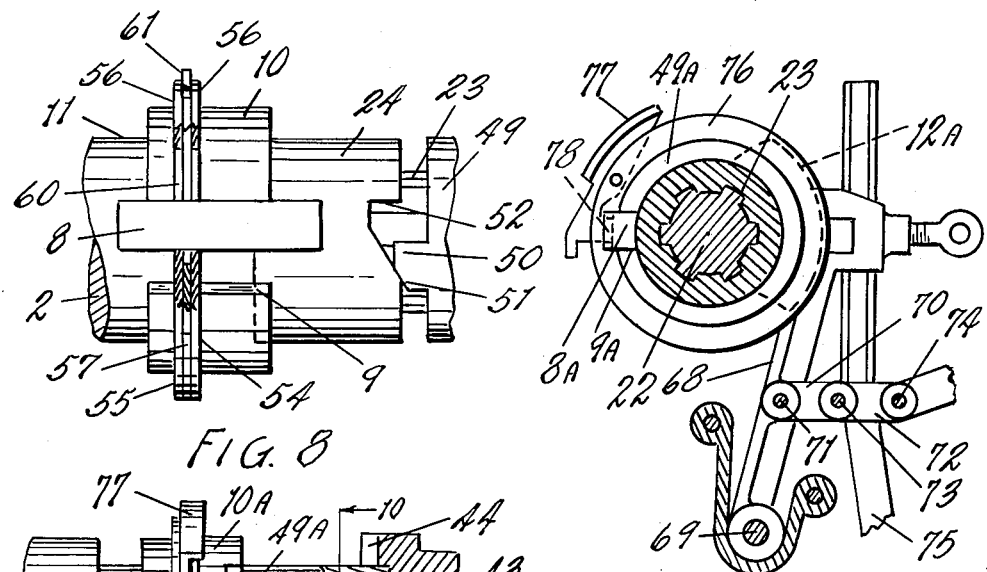
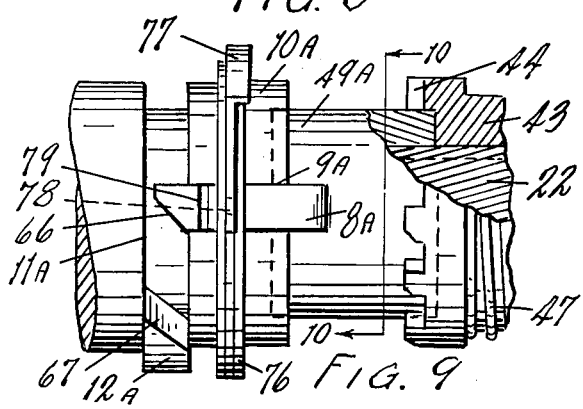
INVENTOR.
Gustaf O. Johnson
BY Otto A. Earl
Attorney.

United States Patent Office 2,717,676
Patented Sept. 13, 1955

2,717,676

CLUTCH FOR PUNCH PRESSES

Gustaf O. Johnson, Elkhart, Ind., assignor to Johnson Machine & Press Corporation, Elkhart, Ind.

Application October 8, 1951, Serial No. 250,275

17 Claims. (Cl. 192—24)

This invention relates to improvements in clutch for punch presses.

The principal objects of this invention are:

First, to provide a novel form of clutch which is engageable throughout a wide range of relative angular positions of the clutching elements whereby clutching action is almost instantaneous upon actuation of the clutch control.

Second, to provide a clutch for connecting a flywheel to a crank shaft in which the torsional turning forces are distributed completely around the crank shaft thus reducing local torsional stresses and balancing the turning force on the crank shaft.

Third, to provide a clutch for the flywheel of a punch press with a positive lock for holding the clutch disengaged when it is desired to adjust the press.

Fourth, to provide a clutch for connecting the flywheel to the crank shaft of a punch press so that the clutch mechanism may be disassembled from the flywheel and crank shaft for repair or replacement without demounting the heavy flywheel.

Fifth, to provide a clutch of the axially shiftable jaw type having a plurality of axially shiftable jaws which act concurrently to transmit driving force as distinguished from a single axially shiftable clutch member.

Other objects and advantages relating to details of my invention will be apparent from a consideration of the following description and claims. The drawings, of which there are three sheets, illustrate a preferred form of my clutch mechanism and two practical forms of control mechanism therefor.

Fig. 2 is a fragmentary side elevational view of the end of the crank shaft with the hub of the flywheel and the clutch mechanism broken away in longitudinal cross section along the plane of the line 2—2 in Fig. 5.

Fig. 3 is a fragmentary side elevational view of the end of the crank shaft showing the inner driven clutch parts with the outer driving clutch parts and flywheel hub removed, portions of the clutch tripping and locking mechanism are shown in section in this view.

Fig. 4 is a transverse cross sectional view through the end of the crank shaft taken along the plane of the line 4—4 in Fig. 3 and looking toward the shiftable driven clutch parts.

Fig. 5 is a transverse cross sectional view through the clutch parts and crank shaft taken along the plane of the line 5—5 in Fig. 2.

Fig. 6 is a transverse cross sectional view through the crank shaft along the plane of the line 6—6 in Fig. 2 and illustrating the safety lock in disengaged position.

Fig. 7 is a view similar to Fig. 6 but illustrating the safety lock in actuated locked position.

Fig. 8 is a fragmentary side elevational view of the crank shaft and safety lock, partially in section, along the line 8—8 in Fig. 7.

Fig. 9 is a fragmentary side elevational view, partially in section, of a modified form of actuating mechanism for my clutch.

Fig. 10 is a fragmentary cross sectional view taken along the plane of the line 10—10 in Fig. 9 and illustrating a modified tripping structure for the clutch.

Figure 1:
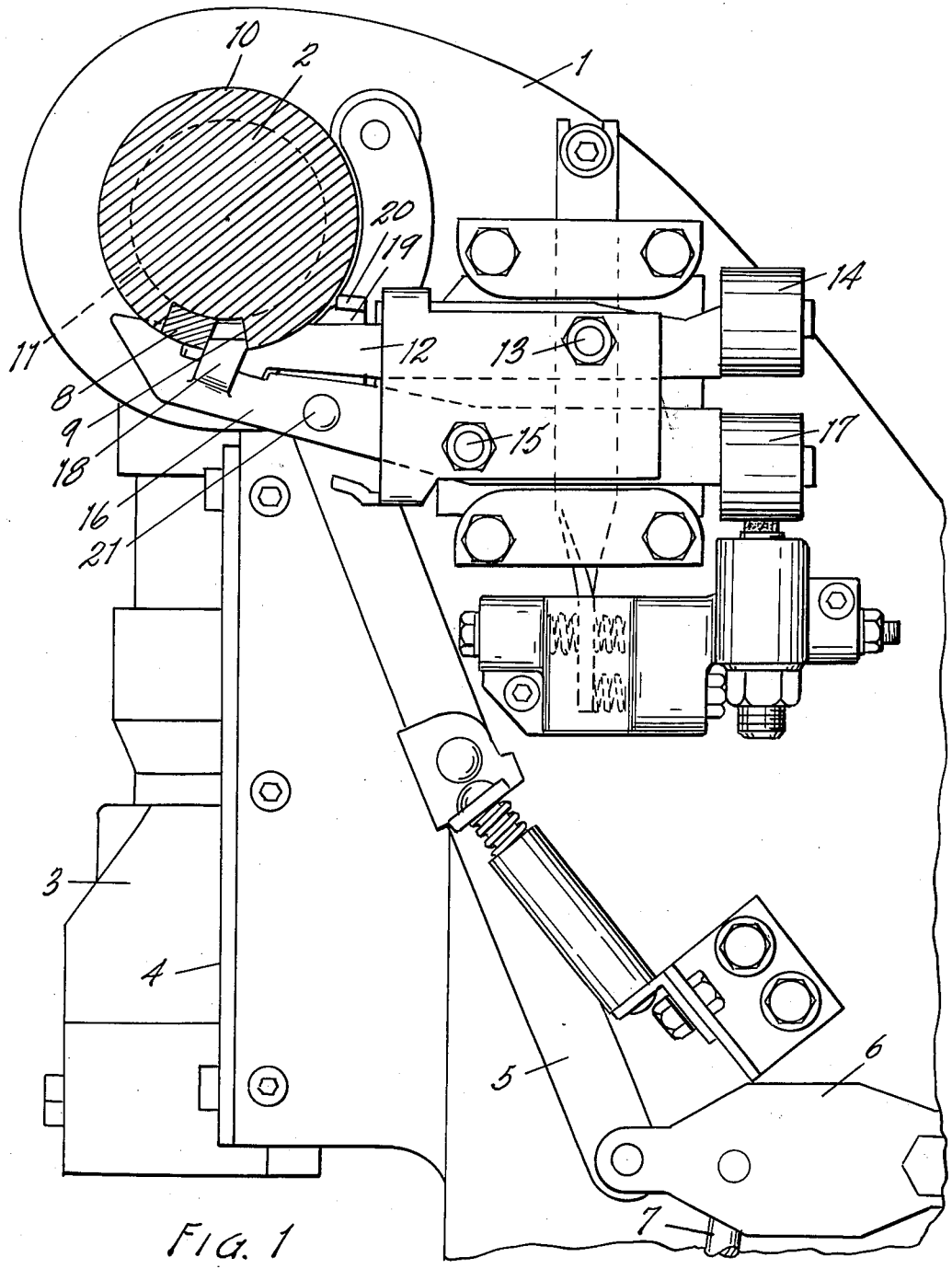
Fig. 1 is a fragmentary side elevational view of the head and crank shaft of a punch press with the shaft cut away in cross section and with the flywheel removed.

Fig. 1 illustrates the general location of my clutch on a punch press together with mechanism for engaging and disengaging the clutch. 1 indicates the frame of a punch press having a crank shaft 2 journalled in the upper end thereof. The crank shaft is arranged to reciprocate a slide or press head 3 in a slideway 4 in the familiar manner and a clutch tripping bar 5 is provided for selectively controlling the operation of the clutch. As is common in machines of this type, the tripping bar is pivotally connected at its lower end to a lever 6 and a trip rod 7 extends downwardly from the lever to a pedal control, not illustrated.

My clutch mechanism includes a cam member which is rotatably sleeved around the crank shaft in a manner to be more particularly described presently. The cam member is provided with an axially extending actuating finger 8 which is angularly oscillatable within an arcuate slot 9 formed in a thickened portion or rib 10 on the crank shaft. The actuating finger 8 projects through the slot 9 into an annular groove 11 where it may be engaged by the end of a latch bar 12 to shift the finger angularly against the trailing end of the slot 9. The latch bar 12 is pivotally mounted on the side of the frame 1 as at 13 and is biased toward latching position by a weight 14. Pivotally supported at 15 below the latch bar 12 is a lock bar 16 also biased upwardly toward the crank shaft by a weight 17. The lock bar is provided with an upstanding lug 18 which moves into the space in the arcuate slot 9 vacated by the actuating finger 8 to prevent unintentional movement of the finger and the clutch mechanism to engaged position. The lock bar 16 is also provided with a disengaging finger 19 which projects upwardly along the inner side of the latch bar 12 and is provided with a disengaging lug 20 overlying the latch bar. The lock bar 16 carries a pin 21 which projects inwardly toward the head of the machine to be received in a notch in the tripping bar 5. Thus downward movement of the bar 5 will depress the lock bar 16 and withdraw the locking lug 18 from the crank shaft. Further downward movement of the tripping bar 5 will engage the lug 20 with the latch bar 12 to disengage the latch bar and permit engagement of the clutch, as will be described. Further details of the latching and locking mechanism form no part of the present invention and are more particularly described and claimed in my copending application for Clutch Tripping and Locking Mechanism for Punch Presses, Serial No. 263,212, filed December 26, 1951, now Patent No. 2,677,447, issued May 4, 1954.

The clutch mechanism, which is actuated by angular movement of the finger 8, is disclosed in detail in Figs. 2 to 5. As is there illustrated, the crank shaft 2 is provided with an outer spindle portion 22 of reduced diameter and splined as at 23. Relatively rotatably mounted on the unsplined inner end of the spindle 22 is a cylindrical cam member 24 to which the previously mentioned cam actuating finger 8 is rigidly attached. The inner end of the cam member 24 abuts against the thickened flange portion 10 of the crank shaft and the finger 8 extends axially inwardly through the arcuate slot 9, as previously described.

An inner roller bearing 25 is mounted on the flange 10 of the crank shaft and an outer roller bearing 26 is mounted on the outer end of the spindle 22 and axially retained in place by an end washer 27 and screw 28. The inner bearing 25 rotatably supports an auxiliary hub ring 29 and the outer bearing 26 rotatably supports a removable inner hub member 30. The flywheel 31 of the punch press is provided with an inner hub portion 32 which is removably secured to the auxiliary hub ring 29 by screws 33 and further connected to the inner hub member 30 and auxiliary ring 29 by screws 34. It will be understood that the screws 33 and 34 are spaced angularly around the hub and spindle as required by the loads to be carried. Removal of the screws 34 permits removal of the inner hub member 30 while the flywheel remains supported on the inner bearing 25 through the screws 33 and auxiliary ring 29.

The interior of the hub portion 32 of the flywheel is cylindrically recessed as at 35 and radially inwardly shouldered as at 36. The inner hub member 30 has an inwardly extending cylindrical flange 37 which closely fits within the recess 35. The inner end of the cylindrical flange 37 is radially and regularly notched as is best illustrated at 38 in Fig. 5. The radial notches 38 receive the radially outer ends of clutch teeth 39 formed on the outer face of a driving clutch plate 40. The clutch plate 40 abuts against the radial shoulder 36 on the hub portion of the flywheel and is secured to the cylindrical flange 37 of the inner hub member by screws 41 so as to be axially removable from the flywheel with the inner hub member 30. The driving clutch plate 40 defines a central opening 42 which clears the periphery of the cam member 24 and the clutch teeth 39 project radially inwardly of the cylindrical flange 37 of the inner hub member.

Splined upon the spindle 22 and within the cylindrical flange 37 of the inner hub is a driven clutch member 43 having the axially inwardly directed jaw teeth 44 formed on the inner end thereof. The jaw teeth 44 are desirably beveled on their meeting edges as at 45 in Fig. 3 and are arranged to be engaged with the outwardly facing driving clutch teeth 39 on the clutch plate 40.

The outer end of the driven clutch member 43 is reduced in diameter, as at 46, to provide space for the coil spring 47. The spring 47 is compressed between the shoulder on the driven clutch member and a thrust plate 48 positioned between the outer end of the driven clutch member 43 and the end of the inner hub member 30. The spring 47 thus constantly urges the driven clutch member axially inwardly of the spindle to engage the teeth 44 with the teeth 39. The action of the spring 47 is opposed and controlled by a cam follower ring 49 which embraces the spindle 22 and bears against the inner end of the driven clutch member radially inwardly from the teeth 44. The cam follower ring 49 is provided with diametrically opposed and axially inwardly extending cam teeth 50 as is best illustrated in Fig. 3. The cam teeth 50 have beveled edges 51 which engage and ride upon corresponding surfaces in two cam notches 52 formed on opposite sides of the outer end of the cylindrical cam member 24. Since the cylindrical cam member 24 is restrained against axially inward motion by engagement with the flange 10 on the crank shaft and since the cam follower ring 49 and teeth 50 are restrained against angular motion relative to the spindle as by being secured to the driven clutch member by screws 53 or by being directly splined to the spindle, relative rotation of the cylindrical cam member 24 opposite to the rotation of the crank shaft and spindle will cause the cam surface 51 of the cam follower 50 to ride upwardly on the cam notch 52 and force the driven clutch member 43 axially outwardly on the spindle and out of engagement with the driving clutch teeth 39. The previously described action of the latch bar 12 in stopping the actuating finger 8 causes this relative backed rotation of the cam member and disengages the clutch. When the lock bar 16 and latch bar 12 are retracted, the pressure of the spring 47 forces the driven clutch member 43 and cam follower ring 49 axially inwardly of the spindle with the cammed surface 51 on the tooth 50 acting against the cam notch 52 to angularly advance the cam member 24 and actuating finger 8 relative to the crank shaft until the clutch teeth are engaged and the crank shaft is again rotating with the flywheel.

Attention is called to the fact that the driven clutch teeth 44 will engage the driving clutch teeth 39 in any relative angular position of the flywheel and crank shaft in which the teeth will mesh. In the example illustrated there are ten clutch teeth so that the flywheel never has to rotate more than one-tenth of a revolution or 36° before the teeth will mesh and engage the clutch. A press controlled by this clutch will therefore respond very quickly to actuation of its trip mechanism. The turning forces of the flywheel on the crank shaft are equally and completely distributed around the crank shaft and all of the clutch teeth carry part of the driving load so that there is no localized high stress in the clutch.

The use of the cylindrical cam member 24 and its actuating finger 8 to engage and disengage the clutch permits the use of the safety lock illustrated in Figs. 3 and 6 to 8. The thickened flange 10 of the flywheel is annularly slotted, as at 54, with the annular slot intersecting the radial slot 9 through which the actuating finger 8 is disposed. The annular slot 54 rotatably receives a laminated lock ring 55 consisting of two segmental plates 56 having their ends pivotally connected to a third half segment plate 57 by the fixed rivet 58 and a releasable pin connection 59. The segmental plates 56 and 57 thus form a ring which can be assembled over the spindle and within the groove 54. The segmental plates 56 define an arcuate slot 60 through which the cam actuating finger extends. The plates 56 further pivotally support a locking lever 61 having an inwardly directed locking lug 62 engageable in a pair of recesses 63 and 64 formed in the crank shaft at the bottom of the groove 54. A spring 65 urges the locking lever and lug into engagement with the crank shaft. When the clutch and press are in operating unlocked condition, the locking ring 55 and lug 62 are in the position illustrated in Fig. 6 with the arcuate slots 60 overlying or coinciding generally with the arcuate notch 9 in the flange 10 of the crank shaft. In this position the cam actuating finger 8 is free to function between its clutch engaging and clutch disengaging position as previously described. When it is desired to positively lock the clutch against reengagement, the operator has merely to press on the locking lever 61 to release the lug 62 from the recess 63 and rotate the ring 55 until the lug 62 engages the recess 64. In this position the angularly leading edge of the arcuate notches 60 will engage the leading edge of the cam actuating finger 8 to supplement the action of the latch bar 12 and positively hold the cam actuating finger 8 in clutch disengaging position. The operator may then with safety perform any necessary operations on the punch press without stopping the flywheel and driving motor.

Axial engaging and disengaging motion of the driven clutch member can be accomplished by means other than those just described. Figs. 9 and 10 illustrate a modification of the clutch shifting mechanism and a modified form of tripping mechanism particularly adapted to coact with the modified clutch operating mechanism. The splined portion 23 of the end of the crank shaft and the driven clutch element 43 remain the same as in the first form of the clutch just described. The teeth 44 of the driven clutch element are adapted to drivingly engage the same or a similar type of driving clutch element as that in the first form of the clutch, and a portion of the spring 47 for urging the driven clutch element into clutching engagement is illustrated in Fig. 9.

The modified form of clutch actuating structure differs from the first structure primarily in the construction of the follower ring 49-A which takes the place of the cam follower ring 49 and cam member 24 in the first form of the invention. The ring 49-A is axially slidable on the hub 22 and abuts at its outer end against the driven clutch member 43. In the axially inward clutch engaging position of the ring 49-A illustrated, the inner end of the ring bears against a flange 10-A on the crank shaft.

The flange 10-A of the crank shaft is axially slotted as at 9-A to slidably receive the clutch actuating finger 8-A secured to the ring 49-A. As distinguished from the first form of the clutch the axial slot 9-A is the same width as the finger 8-A so that the finger is axially slidable but not rotatable in the slot. The axially inner end of the finger 8-A projects into an annular groove 11-A formed around the crank shaft inwardly of the flange 10-A. The leading edge of the inner end of the finger 8-A is cammed or beveled as at 66 to engage and coact with the beveled edge 67 of a clutch tripping shoe 12-A corresponding in function to the latch bar 12 in the first form of the invention. It will be noted that the shoe 12-A is slidable in the groove 11-A, but substantially fills the groove so as to be supported against displacement axially of the shaft. Obviously when the shoe 12-A is positioned in the groove the finger 8-A will be forced axially along the shaft, and the ring 49-A will move correspondingly to disengage the driven clutch member 43.

A highly practical structure for selectively moving the shoe 12-A into and out of operative relationship with the finger 8-A is illustrated in Fig. 10 wherein the shoe 12-A is illustrated as being mounted on an arm 68 pivoted to the side of the press at 69. A link 70 is pivotally connected at 71 to the arm 68 and is pivotally connected at its other end to a second link 72 as at 73. The other end of the link 72 has a fixed pivotal connection 74 to the side of the press so that the links 70 and 72 form a toggle capable of controlling swinging motion of the arm 68 and shoe 12-A into and out of the groove 11-A. A generally vertically extending trip rod 75 is connected to the movable pivot 73 of the toggle to straighten or break the toggle joint. Straightening of the toggle joint moves the arm 68 and shoe 12-A into the annular groove in clutch disengaging position. Breaking of the toggle link retards the shoe 12-A and permits the clutch to engage. The tripping mechanism including the shoe 12-A, toggle connections 70—72, and trip bar 75 are more particularly described and claimed in my Patent 2,178,205 issued October 31, 1939, for Punch Press Control.

The safety lock structure of the first clutch mechanism can be adapted with little trouble to the modified clutch actuating mechanism. A separable ring of segmental stampings 76 is adjustably received in a groove formed around the flange 10-A of the shaft. The ring 76 carries a locking lever 77 having a lock pawl 78 on the inner side of one end thereof. The pawl 78 is adapted to snap into the lock groove 79 formed transversely in the finger 8-A to retain the finger in its outwardly retracted clutch disengaging position. With the pawl 78 engaged in the groove, no amount of adjustment or maladjustment of the shoe 12-A will permit the finger 8-A and ring 49-A to move inwardly to clutch engaging position.

Having thus described my invention, what I claim as new and desire to secure by Letters Patent is:

1. A clutch for selectively connecting the flywheel and crank shaft of a punch press comprising a splined portion on the end of said crank shaft, a radially thickened flange on said crank shaft adjacent to said splined portion and forming an arcuate segmental notch, an inner bearing on said flange, a flywheel supported on its inner side on said bearing and overhanging said splined portion, an inner hub member removably secured within said flywheel from the outer side thereof and forming an inner chamber embracing said splined portion of said crank shaft, an outer bearing supporting said inner hub member from the outer end of said splined portion, driving clutch teeth carried by the inner end of said inner hub member and facing axially outwardly within said chamber, a driven clutch member splined on said splined portion and slidable axially thereon within said chamber, driven clutch teeth on the inner end of said driven clutch member engageable with said driving clutch teeth, said clutch teeth being equiangularly spaced around said shaft, a coil spring compressed between said driven clutch member and said inner hub member and urging said clutch member toward engaged position, a cylindrical cam member carried by said shaft on the outer side of said flange and being relatively angularly movable on said shaft and having a cam actuating finger extending axially through said notch in said flange on said crank shaft, said cam member having diametrically opposed cam notches formed in its outer end with axially inclined cam surfaces, a cam follower ring disposed between said inner clutch member and said cam member and nonrotatably embracing said shaft, cam teeth on said cam follower ring cammingly engageable with said notches in said cam member to impart axial movement to said cam follower and driven clutch member upon relative angular rotation between said cam member and said crank shaft, a latch bar pivoted on said press and swingable transversely of said shaft to abut the side of said actuating finger, a lock bar pivoted on said press and swingable transversely of said shaft and adjacent said latch bar, a locking lug on said lock bar engageable in said notch in said flange alongside said actuating finger in the clutch releasing position thereof, and a release lug on said lock bar engageable with said latch bar to retract said latch bar from said actuating finger upon retraction of said locking lug from said notch.

2. A clutch for selectively connecting the flywheel and crank shaft of a punch press comprising a splined portion on the end of said crank shaft, a radially thickened flange on said crank shaft adjacent to said splined portion and forming an arcuate segmental notch, an inner bearing on said flange, a flywheel supported on its inner side on said bearing and overhanging said splined portion, an inner hub member removably secured within said flywheel from the outer side thereof and forming an inner chamber embracing said splined portion of said crank shaft, an outer bearing supporting said inner hub member from the outer end of said splined portion, driving clutch teeth carried by the inner end of said inner hub member and facing axially outwardly within said chamber, a driven clutch member splined on said splined portion and slidable axially thereon within said chamber, driven clutch teeth on the inner end of said driven clutch member engageable with said driving clutch teeth, said clutch teeth being equiangularly spaced around said shaft, a spring compressed between said driven clutch member and said inner hub member and urging said clutch member toward engaged position, a cam member carried by said shaft on the outer side of said flange and being relatively angularly movable on said shaft and having a cam actuating finger extending axially through said notch in said flange on said crank shaft, said cam member having a cam notch formed in its outer end with an axially inclined cam surface, a cam follower disposed between said inner clutch member and said cam member and non-rotatably associated with said clutch member, a tooth on said cam follower cammingly engageable with said notch in said cam member to impart axial movement to said cam follower and driven clutch member upon relative angular rotation between said cam member and said crank shaft, a latch bar pivoted on said press and swingable transversely of said shaft to abut the side of said actuating finger, a lock bar pivoted on said press and swingable transversely of said shaft and adjacent said latch bar, a locking lug on said lock bar engageable in said notch in said flange alongside said actuating finger in the clutch releasing position thereof, and a release lug on said lock bar engageable with said latch bar to retract said latch bar from said actuating finger upon retraction of said locking lug from said notch.

3. A clutch for connecting the flywheel and crank shaft of a machine comprising a spindle on the end of said crank shaft, a radially thickened flange on said crank shaft adjacent to said spindle and forming an arcuate segmental slot, an inner bearing on said shaft, a flywheel supported on its inner side on said bearing and overhanging said spindle, an inner hub member removably secured to the outer side of said flywheel and forming an inner chamber embracing said spindle, an outer bearing supporting said inner hub member from the outer end of said spindle, driving clutch teeth carried by the inner end of said inner hub member and facing axially outwardly within said chamber, a driven clutch member nonrotatably mounted on said spindle and slidable axially thereon within said chamber, clutch teeth on the inner end of said driven clutch member engageable with said driving clutch teeth, a spring compressed between said driven clutch member and said inner hub member and urging said clutch member toward engaged position, a cam member relatively angularly movable and axially fixed on the inner end of said spindle and having a cam actuating finger extending axially inwardly through said slot in said flange on said crank shaft, said cam member having a cam notch formed in its outer end with an axially inclined cam surface, and a cam follower disposed between said inner clutch member and said cam member and non-rotatably associated with said clutch member and cammingly engaging said notch in said cam member to impart axial movement to said cam follower and driven clutch member upon relative angular rotation between said cam member and said crank shaft, said cam actuating finger being adapted to be laterally engaged by a clutch tripping latch bar.

4. A clutch for connecting the flywheel and crank shaft of a machine comprising a spindle on the end of said crank shaft, an axially extending arcuate segmental slot in said crank shaft adjacent said spindle, an inner bearing on said spindle, a flywheel supported on its inner side on said bearing and overhanging said spindle, an inner hub member removably secured to said flywheel and forming an inner chamber embracing said spindle, an outer bearing supporting said inner hub member from the outer end of said spindle, driving clutch teeth carried on the interior of said flywheel and facing axially outwardly to said chamber, a driven clutch member nonrotatably mounted on said spindle and slidable axially thereon within said chamber, clutch teeth on the inner end of said driven clutch member engageable with said driving clutch teeth, a spring compressed between said driven clutch member and said inner hub member and urging said clutch member toward engaged position, a cam member relatively angularly movable and axially fixed on the inner end of said spindle and having a cam actuating finger extending axially through said slot in said crank shaft, said cam member having an axially inclined cam surface on its outer end, and a cam follower disposed between said inner clutch member and said cam member and non-rotatably embracing said spindle, said cam follower cammingly engaging said cam member to impart axial movement to said cam follower and driven clutch member upon relative angular rotation between said cam member and said crank shaft, said cam actuating finger having a laterally facing surface adapted to be engaged by a clutch tripping latch bar.

5. A clutch for connecting the flywheel and crank shaft of a machine comprising a spindle on the end of said crank shaft, an inner bearing on said spindle, a flywheel supported on its inner side on said bearing and overhanging said spindle, an inner hub member removably secured to said flywheel and forming an inner chamber embracing said spindle, an outer bearing supporting said inner hub member from the outer end of said spindle, driving clutch teeth carried on the interior of said flywheel within said chamber and facing axially outwardly of said chamber, a driven clutch member nonrotatably mounted on said spindle and slidable axially thereon within said chamber, clutch teeth on the inner end of said driven clutch member engageable with said driving clutch teeth, a spring compressed between said driven clutch member and said inner hub member and urging said clutch member toward engaged position, a follower disposed against said inner clutch member and nonrotatably embracing said spindle, and means cammingly engageable with said follower to impart axial movement to said follower and driven clutch member upon relative angular rotation between said means and said crank shaft.

6. A clutch for drivingly connecting a driving wheel to a driven shaft extending through and supporting said wheel comprising, a driven clutch member nonrotatably and slidably mounted on said shaft within said wheel, axially facing clutch teeth on said driven clutch member and equiangularly spaced therearound, driving clutch teeth carried by and equiangularly spaced around the interior of said wheel and opposed to said driven clutch teeth, bearings supporting said wheel on said shaft, coil spring means compressed between said wheel and said driven clutch member and urging said teeth into clutching engagement, a cam member carried by said shaft and having limited relative rotary movement about the axis of the shaft, an axially inclined cam surface on said cam member, a cam follower engageable between said cam surface and said driven clutch member in opposition to said spring means, and an actuating portion on said cam member and extending axially therefrom to provide a radially extending surface adapted to be engaged by a clutch latch element to effect relative angular motion between said cam member and said shaft, said shaft having an axially extending segmental arcuate slot therein receiving said actuating portion to limit angular motion of said cam member.

7. A clutch for drivingly connecting a driving wheel to a driven shaft extending through and supporting said wheel comprising, a driven clutch member nonrotatably and slidably mounted on said shaft, axially facing clutch teeth on said driven clutch member and equiangularly spaced therearound, driving clutch teeth carried by and equiangularly spaced around said wheel and opposed to said driven clutch teeth, bearings supporting said wheel on said shaft, spring means acting between said wheel and said driven clutch member and urging said teeth into clutching engagement, a cam member carried by said shaft and having limited relative rotary movement about the axis of the shaft, an axially inclined cam surface on said cam member, a cam follower engageable between said cam surface and said driven clutch member in opposition to said spring means, and an actuating portion on said cam member and extending therefrom to provide a radially extending surface adapted to be engaged by a clutch latch element to effect relative angular motion between said cam member and said shaft, said shaft having arcuately spaced stops thereon engageable with said cam member to limit angular motion of said cam member.

8. A clutch for drivingly connecting a wheel member to a shaft member extending through and supporting said wheel member comprising, a driven clutch element nonrotatably and slidably mounted on one of said members and within said wheel, axially facing clutch teeth on said driven clutch element and equiangularly spaced therearound, driving clutch teeth on the other of said members and equiangularly spaced around the interior of said wheel and opposed to said driven clutch teeth, a bearing supporting said wheel on said shaft, coil spring means compressed between said other of said members and said driven clutch element and urging said teeth into clutching engagement, a cam carried by said one of said members and having limited relative rotary movement about the axis of said one of said members, an axially inclined cam surface on said cam, a cam follower engageable between said cam surface and said driven clutch element in opposition to said spring means, and an actuating portion on said cam providing a radially extending surface adapted to be engaged by a clutch latch element to effect relative angular motion between said cam and said one of said members.

9. A clutch for drivingly connecting a wheel member to a shaft member extending through and supporting said wheel member comprising, a driven clutch element nonrotatably and slidably mounted on one of said members, axially facing clutch teeth on said driven clutch element and equiangularly spaced therearound, driving clutch teeth on the other of said members and equiangularly spaced around said wheel and opposed to said driven clutch teeth, a bearing supporting said wheel on said shaft, spring means acting between said other of said members and said driven clutch element and urging said teeth into clutching engagement, a cam carried by said one of said members and having limited relative rotary movement about the axis of said one of said members, an axially inclined cam surface on said cam, a cam follower engageable between said cam surface and said driven clutch element in opposition to said spring means, and an actuating portion on said cam providing a radially extending surface adapted to be engaged by a clutch latch element to effect relative angular motion between said cam and said one of said members.

10. A clutch for drivingly connecting a rotatable driving member to a coaxially arranged rotatable driven member extending through and supporting said driving member comprising, a clutch element nonrotatably and slidably mounted on one of said members, axially facing clutch teeth on said clutch element and equiangularly spaced therearound, driving clutch teeth carried by the other of said members and equiangularly spaced around the interior of said other of said members and opposed to said teeth on said clutch element, bearings supporting said driving member on said driven member, spring means compressed between said other of said members and said clutch element and urging said teeth into clutching engagement, a cam carried by said one of said members and having limited relative rotary movement about the axis of said one of said members, an axially inclined cam surface on said cam, a cam follower engageable between said cam surface and said clutch element in opposition to said spring means, and an actuating portion on said cam adapted to be engaged by a latch element to effect relative angular motion between said cam and said one of said members.

11. In a clutch mechanism including a shaft with a wheel rotatably mounted thereon, the combination of an axially movable clutch member nonrotatably secured to said shaft, axially facing coacting clutch teeth on said wheel and said member, spring means biasing said clutch member toward engaged position, an axially fixed cam member rotatably mounted around said shaft and having an axially inclined cam surface opposed to said clutch member, a follower engageable between said cam surface and said clutch member, an axially extending radially projecting actuating portion on said cam member adapted to be engaged by a latch to disengage said clutch, means on said shaft forming an axially and radially extending segmental arcuate slot receiving said actuating portion and limiting angular movement thereof, a safety ring rotatably mounted around said shaft and embracing said actuating portion of said cam member, said ring having a segmental slot therein passing said actuating portion, and a manually releasable lock member carried by said ring and lockingly engageable with said shaft in locked and unlocked angularly rotated positions to selectively position an edge of the segmental slot in said ring against said actuating portion in the clutch disengaged position of said cam member.

12. In a clutch mechanism including a shaft with a wheel rotatably mounted thereon, the combination of an axially movable clutch member nonrotatably secured to said shaft, axially facing coacting clutch teeth on said wheel and said member, an axially fixed cam member rotatably mounted around said shaft and having an axially inclined cam surface opposed to said clutch member, a follower engageable between said cam surface and said clutch member, a radially projecting actuating portion on said cam member, means on said shaft forming an axially and radially extending segmental arcuate slot receiving said actuating portion and limiting angular movement thereof, a safety ring rotatably mounted around said shaft and embracing said actuating portion of said cam member, said ring having a segmental slot therein passing said actuating portion, and a manually releasable lock member carried by said ring and lockingly engageable with said shaft in locked and unlocked angularly rotated positions to selectively position an edge of the segmental slot in said ring against said actuating portion in the clutch disengaged position of said cam member.

13. In a clutch mechanism including a shaft element with a wheel element rotatably mounted thereon, the combination of an axially movable clutch member nonrotatably secured to one of said elements, axially facing coacting clutch teeth on the other of said elements and said member, spring means biasing said clutch member toward engaged position, an axially fixed cam member angularly adjustably mounted on the one of said elements which is driven and having an axially inclined cam surface opposed to said clutch member, a means cammingly engageable between said cam member and said clutch member, a radially projecting actuating portion on said cam member, a safety ring rotatably mounted around the one of said elements which is driven and embracing said actuating portion of said cam member, said ring having a segmental slot therein passing said actuating portion, and a manually releasable lock member carried by said ring and lockingly engageable with said driven element in locked and unlocked angularly rotated positions to position an edge of the segmental slot in said ring against said actuating portion in the clutch disengaged position of said cam member.

14. Clutch mechanism for selectively drivingly connecting a wheel to a shaft on which the wheel is rotatably mounted comprising, a shiftable clutch member axially slidably and nonrotatively mounted on said shaft and within said wheel, coacting axially facing teeth on said wheel and said member, a spring biasing said member toward tooth engaging position, a sleeve relatively nonrotatably and slidably mounted on said shaft and bearing against said member in opposition to said spring, an axially facing cam surface formed on a portion of said sleeve and at the opposite end thereof from said member, an actuating element fixed axially with respect to said shaft and having an axially facing cam surface engageable with said cam surface on said actuating element by rotation of said sleeve relative to said element, and selectively operable means for bringing said element into relatively nonrotatably fixed position with respect to said shaft with said cam surfaces in coacting relation whereby continued rotation of said shaft and sleeve moves said sleeve and clutch member to clutch disengaged position.

15. In combination with the crank shaft of a punch press and a flywheel therefor, means for mounting said wheel on said shaft and releasably drivingly connecting the wheel to the shaft comprising, a splined end on said shaft, a radially projecting flange on said shaft spaced inwardly from said splined end, a bearing supported on said flange and engaging the inner side of side wheel, a chambered hub element secured within said wheel and removable from the outer side thereof, a bearing supporting the outer end of said hub element on the end of said shaft, a shiftable clutch member slidably and nonrotatably engaged with the splined portion of said shaft and positioned within said hub element, coacting axially facing teeth on said hub element and said clutch element, a spring in thrust transmitting relation between said shaft and said clutch element and biasing said teeth toward engaging position, means sleeved around said shaft between said flange and said clutch element and in thrust transmitting relation with said clutch element in opposition to said spring, and an actuating finger carried by said means and projecting axially through an opening in said flange, said finger being adapted to be engaged and moved by a trip element to impart axial motion through said means to said clutch element.

16. In combination with the crank shaft of a punch press and a flywheel therefor, means for mounting said wheel on said shaft and releasably drivingly connecting the wheel to the shaft comprising, a splined end on said shaft, a radially projecting flange on said shaft spaced inwardly from said splined end, a bearing supported on said flange and engaging the inner side of said wheel, a chambered hub element secured within said wheel and removable from the outer side thereof, a bearing supporting the outer end of said hub element on the end of said shaft, a shiftable clutch member slidably and nonrotatably engaged with the splined portion of said shaft and positioned within said hub element, axially facing driving clutch teeth connected to said wheel and positioned at the inner end of said chambered hub element, coacting axially facing teeth on said clutch element, a spring in thrust transmitting relation between said shaft and said clutch element and biasing said teeth to engaging position, and means sleeved around said shaft between said flange and said clutch element and in thrust transmitting relation with said clutch element in opposition to said spring and projecting axially through an opening in said flange to be engaged and moved by a trip element to impart axial motion through said means to said clutch element.

17. In combination with the crank shaft of a punch press and a flywheel therefor, means for mounting said wheel on said shaft and releasably drivingly connecting the wheel to the shaft comprising, a splined end on said shaft, a radially projecting flange on said shaft spaced inwardly from said splined end, a bearing supported on said flange and engaging the inner side of said wheel, a chambered hub element secured within said wheel and removable from the outer side thereof, a bearing supporting the outer end of said hub element on the end of said shaft, a shiftable clutch member slidably and nonrotatably engaged with the splined portion of said shaft and positioned within said hub element, coacting axially facing teeth on said hub element and said clutch element, a spring in thrust transmitting relation between said shaft and said clutch element and biasing said teeth toward engaging position, a sleeve positioned around said shaft between said flange and said clutch element and in thrust transmitting relation with said clutch element in opposition to said spring, and an actuating finger carried by said sleeve and projecting axially through an opening in said flange, said finger having an axially extending bevel at its inner end adapted to be engaged and moved by a trip element to impart axial motion to said sleeve and said clutch element.

References Cited in the file of this patent

UNITED STATES PATENTS

| 958,710 | Biggert, Jr. | May 17, 1910 |
| 1,430,722 | Cameron | Oct. 3, 1922 |
| 1,534,882 | Talbot | Apr. 21, 1925 |
| 1,599,046 | Good | Sept. 7, 1926 |
| 2,140,216 | Wissman | Dec. 13, 1938 |
| 2,166,004 | Hall | July 11, 1939 |
| 2,494,702 | Graves | Jan. 17, 1950 |

FOREIGN PATENTS

| 728,714 | France | July 11, 1932 |